United States Patent
Oshima

(10) Patent No.: US 11,818,480 B2
(45) Date of Patent: Nov. 14, 2023

(54) IMAGING APPARATUS AND CONTROL METHOD THEREOF

(71) Applicant: CANON KABUSHIKI KAISHA, Tokyo (JP)

(72) Inventor: Koji Oshima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/576,591

(22) Filed: Jan. 14, 2022

(65) Prior Publication Data
US 2022/0141409 A1   May 5, 2022

Related U.S. Application Data

(63) Continuation of application No. PCT/JP2020/026058, filed on Jul. 2, 2020.

(30) Foreign Application Priority Data

Jul. 19, 2019 (JP) ................................. 2019-134017

(51) Int. Cl.
*H04N 25/702* (2023.01)

(52) U.S. Cl.
CPC ................................. *H04N 25/702* (2023.01)

(58) Field of Classification Search
CPC ...... H04N 25/702; H04N 25/46; H04N 25/77; H04N 25/443; H04N 25/40; H04N 25/76
See application file for complete search history.

(56) References Cited

U.S. PATENT DOCUMENTS

2001/0004400 A1\* 6/2001 Aoki ................ G08B 13/19602
382/107

FOREIGN PATENT DOCUMENTS

| JP | 2001-175876 A | 6/2001 | |
|---|---|---|---|
| JP | 2006-215260 A | 8/2006 | |
| JP | 2017-108286 A | 6/2017 | |
| JP | 2017108286 A | \* 6/2017 | ............. H04N 5/225 |

(Continued)

OTHER PUBLICATIONS

The International Search Report dated Aug. 25, 2020 of the corresponding International Application, PCT/JP2020/026058.

(Continued)

*Primary Examiner* — Nhan T Tran
(74) *Attorney, Agent, or Firm* — Cowan, Liebowitz & Latman, P.C.

(57) ABSTRACT

An imaging apparatus acquires pixel signals for each predetermined-size partial region of an imaging plane and for detecting a region among the regions of the imaging plane in which a subject image has changed, the number of acquired pixel signals being less than the number of pixels included in the partial region, and controls to perform image capturing in response to detection of the region in which the subject image has changed, and to output a captured image based the pixel signals. The imaging apparatus acquires pixel signals from each partial region of the imaging plane by, when pixel signals are to be acquired from a first partial region of the imaging plane, acquiring pixel signals from a second partial region that is adjacent to the first partial region and partially overlapped with the first partial region.

11 Claims, 18 Drawing Sheets

(56) References Cited

FOREIGN PATENT DOCUMENTS

JP    2018-022935 A    2/2018

OTHER PUBLICATIONS

The above foreign patent documents were cited in the Sep. 8, 2023 Japanese Office Action, a copy of which is enclosed without an English Translation, that issued in Japanese Patent Application No. 2019-134017.

* cited by examiner

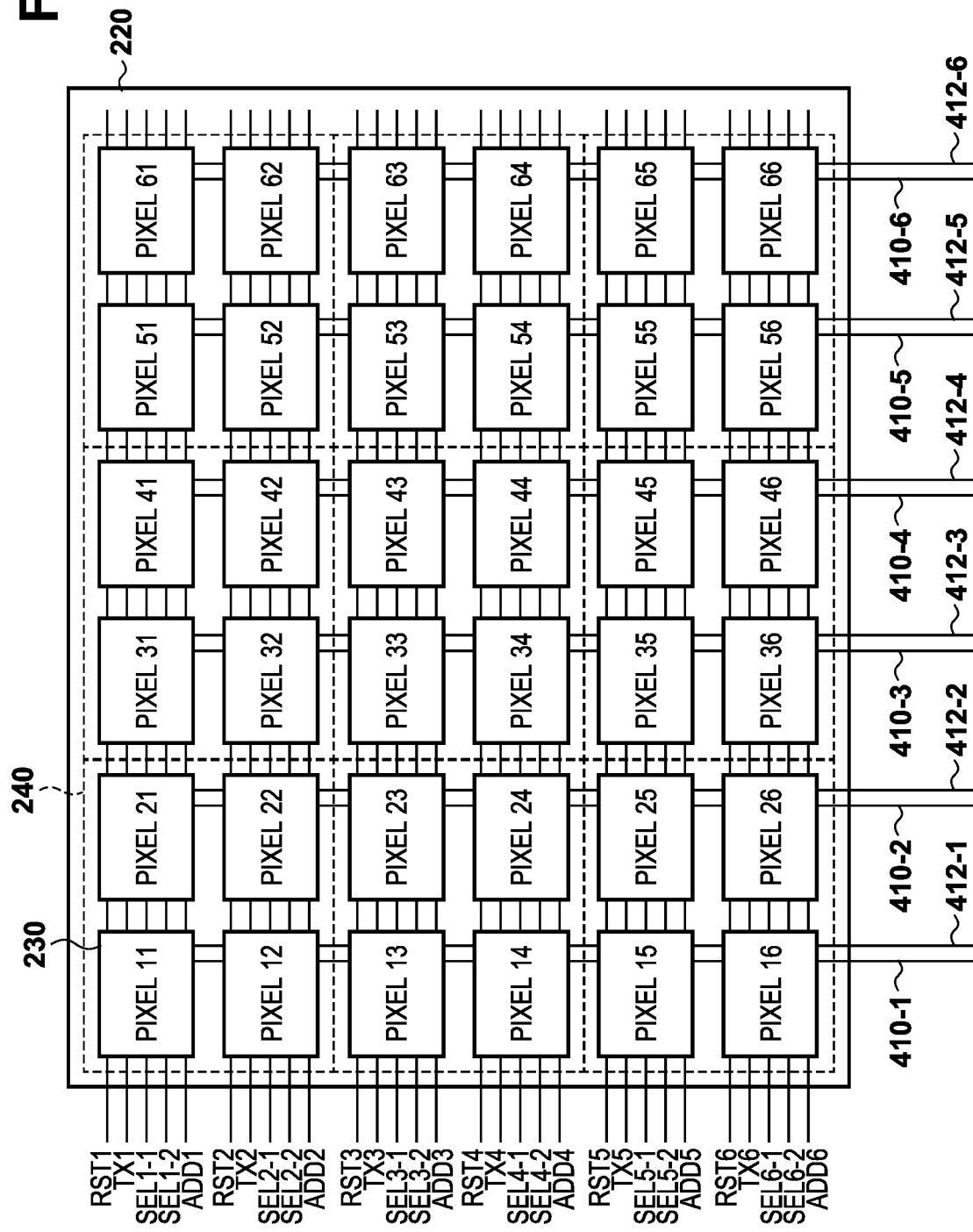

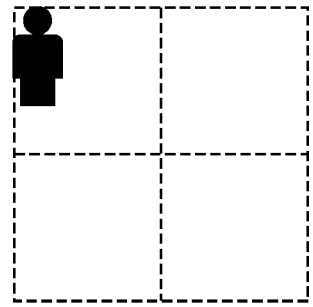
F I G. 8A
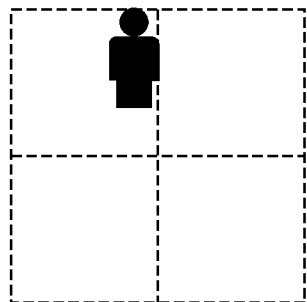
F I G. 8B
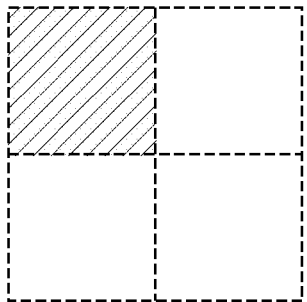
F I G. 8C

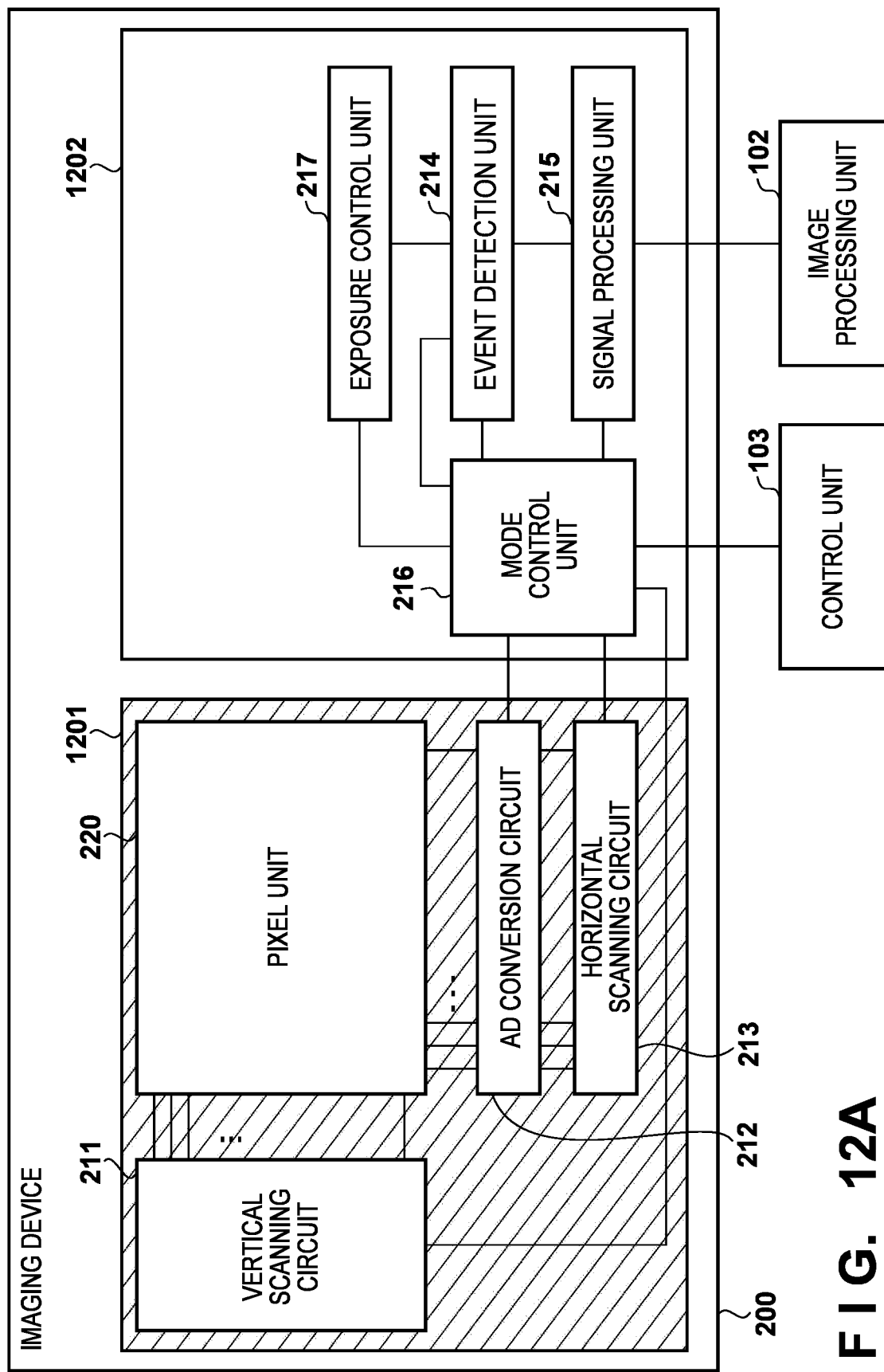
F I G. 12A

F I G. 12B
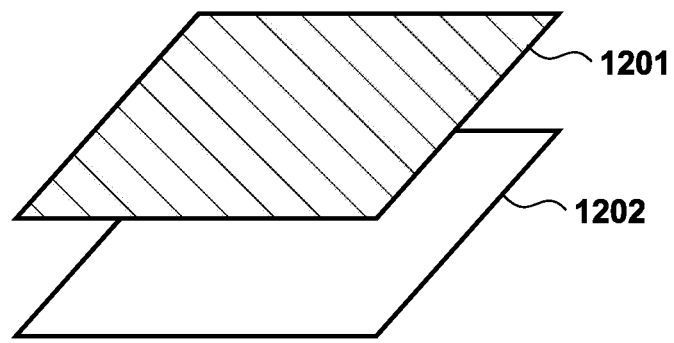
F I G. 12C
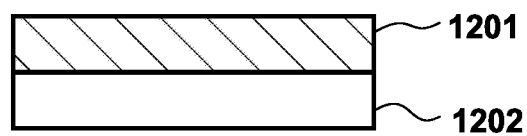

IMAGING APPARATUS AND CONTROL METHOD THEREOF

CROSS-REFERENCE TO RELATED APPLICATIONS

This application is a Continuation of International Patent Application No. PCT/JP2020/026058, filed Jul. 2, 2020, which claims the benefit of Japanese Patent Application No. 2019-134017, filed Jul. 19, 2019, both of which are hereby incorporated by reference herein in their entirety.

BACKGROUND OF THE INVENTION

Field of the Invention

The present invention relates to an imaging apparatus and a control method thereof.

Background Art

Conventionally, an imaging apparatus has been used to observe and monitor a target by using an image. As an imaging apparatus used for such a purpose, there is known to be an apparatus that captures and records frame images at a predetermined time interval and an apparatus that starts imaging and recording in response to detection of a change in a subject image from a difference in luminance values between consecutive frames.

PTL 1 discloses a technique for detecting a change in a subject image by using output obtained by pixel addition in each divided block of an imaging device in a drive mode different from normal image capturing in which imaging and recording are performed, and reducing the information processing volume for image information involving the detection, to reduce power consumption.

PTL 2 discloses a technique for detecting a change in a subject image in images being captured and for performing pixel addition or thinning processing when the detected amount of change is smaller than a predetermined threshold, to reduce the processing load of image processing when a desired amount of change is not detected.

CITATION LIST

Patent Literature

PTL1: Japanese Patent Laid-Open No. 2018-22935
PTL2: Japanese Patent Laid-Open No. 2006-215260

A solid-state imaging device disclosed in PTL 1 performs pixel addition for each divided block to detect a change in a subject image in divided block units. For this reason, when the subject image in a divided block moves in small motions, there may be no change or a small change in the pixel signal obtained through pixel addition, and a desired detection result may not be obtained.

In a microscope system disclosed in PTL 2, detection of a change in a subject image and addition processing are performed by an image processing unit or a pixel-number converter external to an imaging unit (i.e., an imaging device). That is, the imaging unit is always outputting images of a large number of pixel signals, and the reduction of power consumption of the imaging unit itself is not considered.

The present disclosure has been made in consideration of the aforementioned issues, and realizes a technique that enables reduction of power consumption and enhancement of detection accuracy in detection operations of detecting a change in a subject image in an imaging apparatus that performs image capturing in response to detection of a change in a subject image.

SUMMARY OF THE INVENTION

In order to solve the aforementioned issues, one aspect of the present disclosure provides an imaging apparatus comprising: detecting unit that acquires pixel signals for each predetermined-size partial region of an imaging plane having a plurality of pixels arranged in a two-dimensional pattern and for detecting a region among the regions of the imaging plane in which a subject image has changed, the number of acquired pixel signals being less than the number of pixels included in the partial region; and controller that controls to perform image capturing in response to detection of the region in which the subject image has changed by the detecting unit, and to output a captured image based the pixel signals from the pixels of the imaging plane, wherein the detecting unit acquires pixel signals from each partial region of the imaging plane by, when pixel signals are to be acquired from a first partial region of the imaging plane, acquiring pixel signals from a second partial region that is adjacent to the first partial region and partially overlapped with the first partial region, and detects the region in which the subject image has changed among the regions of the imaging plane.

Another aspect of the present disclosure provides a control method of an imaging apparatus comprising: a detecting step of acquiring pixel signals for each predetermined-size partial region of an imaging plane having a plurality of pixels arranged in a two-dimensional pattern and for detecting a region among the regions of the imaging plane in which a subject image has changed, the number of acquired pixel signals being less than the number of pixels included in the partial region; and a controlling step of performing control to perform image capturing in response to detection of the region in which the subject image has changed in the detecting step, and to output a captured image based the pixel signals from the pixels of the imaging plane, wherein in the detecting step, pixel signals are acquired from each partial region of the imaging plane by, when pixel signals are to be acquired from a first partial region of the imaging plane, acquiring pixel signals from a second partial region that is adjacent to the first partial region and partially overlapped with the first partial region, and the region in which the subject image has changed is detected among the regions of the imaging plane.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3A is a diagram illustrating a configuration example of a pixel unit according to a present embodiment.

FIG. 3BB is a diagram illustrating an example of the range of a pixel block (partial region) of a pixel unit according to a present embodiment.

FIG. 3BC is a diagram illustrating an example of the range of a pixel block (partial region) of a pixel unit according to a present embodiment.

FIG. 3BD is a diagram illustrating an example of the range of a pixel block (partial region) of a pixel unit according to a present embodiment.

FIG. 8A is a diagram illustrating an example of a subject image on an imaging plane when a conventional technique is used.

FIG. 8B is a diagram illustrating an example of a subject image on an imaging plane that has shifted when a conventional technique is used.

FIG. 8C is a diagram illustrating an example of pixel signals obtained for a subject image when a conventional technique is used.

FIG. 12A is a diagram illustrating an example of an imaging device according to a present embodiment implemented by a stacked structure.

FIG. 12B is a diagram illustrating an example of an imaging device according to a present embodiment implemented by a stacked structure.

FIG. 12C is a diagram illustrating an example of an imaging device according to a present embodiment implemented by a stacked structure.

DESCRIPTION OF THE EMBODIMENTS

Figure 1:
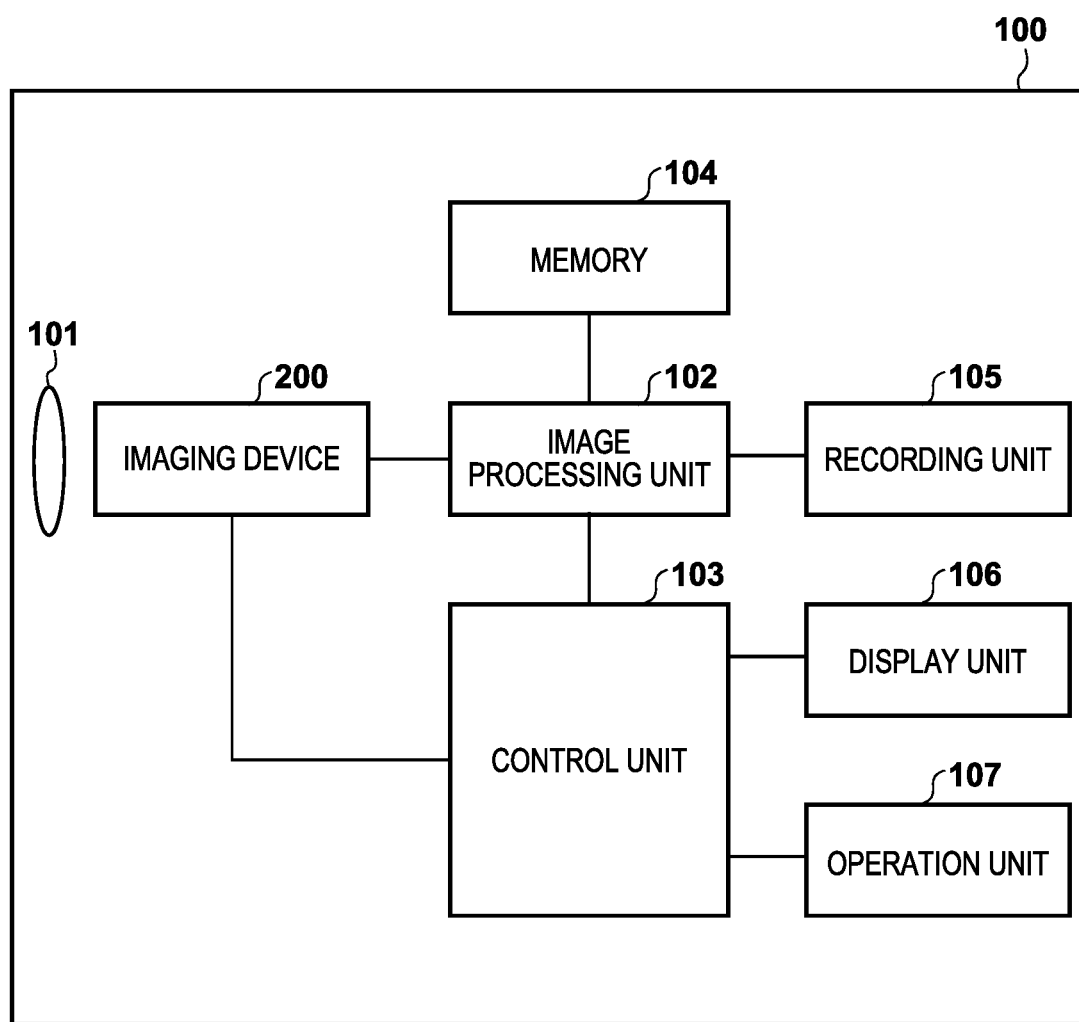
FIG. 1 is a block diagram illustrating a functional configuration example of a digital camera as an example of an imaging apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Now will be described as an example of an imaging apparatus, an example using a digital camera capable of recording a captured image after detection of a change in a subject image by using an imaging device capable of detecting a change in the subject image. However, the present embodiment is applicable not only to a digital camera but also to other apparatuses capable of recording captured images after detection of changes in a subject image by using imaging devices capable of detecting a change in the subject image. Such apparatuses may include, for example, personal computers, portable telephones including smartphones, game machines, tablet terminals, medical devices, monitoring systems, and in-vehicle systems.

Configuration of Digital Camera

FIG. 1 is a block diagram illustrating a functional configuration example of a digital camera as an example of the imaging apparatus of the present embodiment. One or more of the functional blocks illustrated in FIG. 1 may be implemented by hardware, such as an ASIC or a programmable logic array (PLA), or may be implemented by a programmable processor, such as a CPU or an MPU, executing software. Alternatively, they may be implemented by a combination of software and hardware. Therefore, in the following description, even when different functional blocks are described as operation subjects, the same hardware can be implemented as the subjects.

An imaging lens 101 constitutes an image capturing optical system and condenses light from a subject to an imaging device 200. The imaging device 200 includes, for example, a complementary metal oxide semiconductor (CMOS) image sensor, and photoelectrically converts the light incident through the imaging lens 101. The imaging device 200 performs analog-to-digital conversion of the photoelectrically converted signals by an AD conversion circuit described below to output image signals in pixel units. The imaging device 200 has a control function for changing the drive control of the imaging device 200 itself in accordance with the amount of change in the output values from the internal pixel unit and the detection results of changed regions. The imaging device 200 has, for example, a normal image capturing mode and a detection mode as its operation modes.

In the normal image capturing mode, the imaging device 200 outputs pixel signals as a captured image for recording, whereas in the detection mode, the imaging device 200 changes to the normal image capturing mode from detection of a change in the subject image. Although the details will be described below, this control function enables control from a detection mode for detecting a change in a subject image inside the imaging device 200 to the normal image capturing mode. The imaging device 200 can output, for example, image signals composed of 3840×2160 pixels (so-called 4K) or image signals composed of 1920×1080 pixels (so-called FullHD) as a captured image.

An image processing unit 102 performs various types of correction, such as filtering, and digital image processing, such as compression, on the image signals output from the imaging device 200. The image processing unit 102 also performs image processing, such as resizing, in accordance with each mode on the image signals captured in 4K, FullHD mode, or the like.

A control unit 103 includes, for example, one or more processors, such as a central processing unit (CPU). The control unit 103 comprehensively controls the operation of an entire digital camera 100 including the image processing unit 102, the display unit 106, and the like by loading and executing programs recorded in a recording unit 105 described below in a memory 104. Since the imaging device 200 has the detection mode for changing to the normal image capturing mode from detection of a change in the subject image, the control unit 103 also performs control for permitting the imaging device 200 to operate in the detection mode.

The memory 104 is, for example, a volatile memory, such as an SDRAM. The memory 104 temporarily stores image signals output from the image processing unit 102, data required for processing by the control unit 103, and the like. The recording unit 105 includes, for example, a non-volatile recording medium, such as a semiconductor memory or a magnetic disk, and records and holds image signals (i.e., a captured image) output from the image processing unit 102.

The display unit 106 includes, for example, a display device, such as a liquid crystal display or an organic EL display, and displays a captured image or an image read from the recording unit 105. The display unit 106 also displays an operation screen, a setting screen, and the like for the user to operate and set the digital camera 100.

The operation unit 107 includes, for example, switches for inputting various operations related to image capturing, such as a power button, a shutter button, and buttons for instructing recording start and stop of moving images. The operation unit 107 includes, for example, a menu display button, an enter button, other cursor keys, and a touch screen. When the operation unit 107 receives an operation to these keys and buttons from a user, the control unit 103 controls the components of the digital camera 100 in accordance with the operation content.

Configuration of Imaging Device 200

Figure 2:
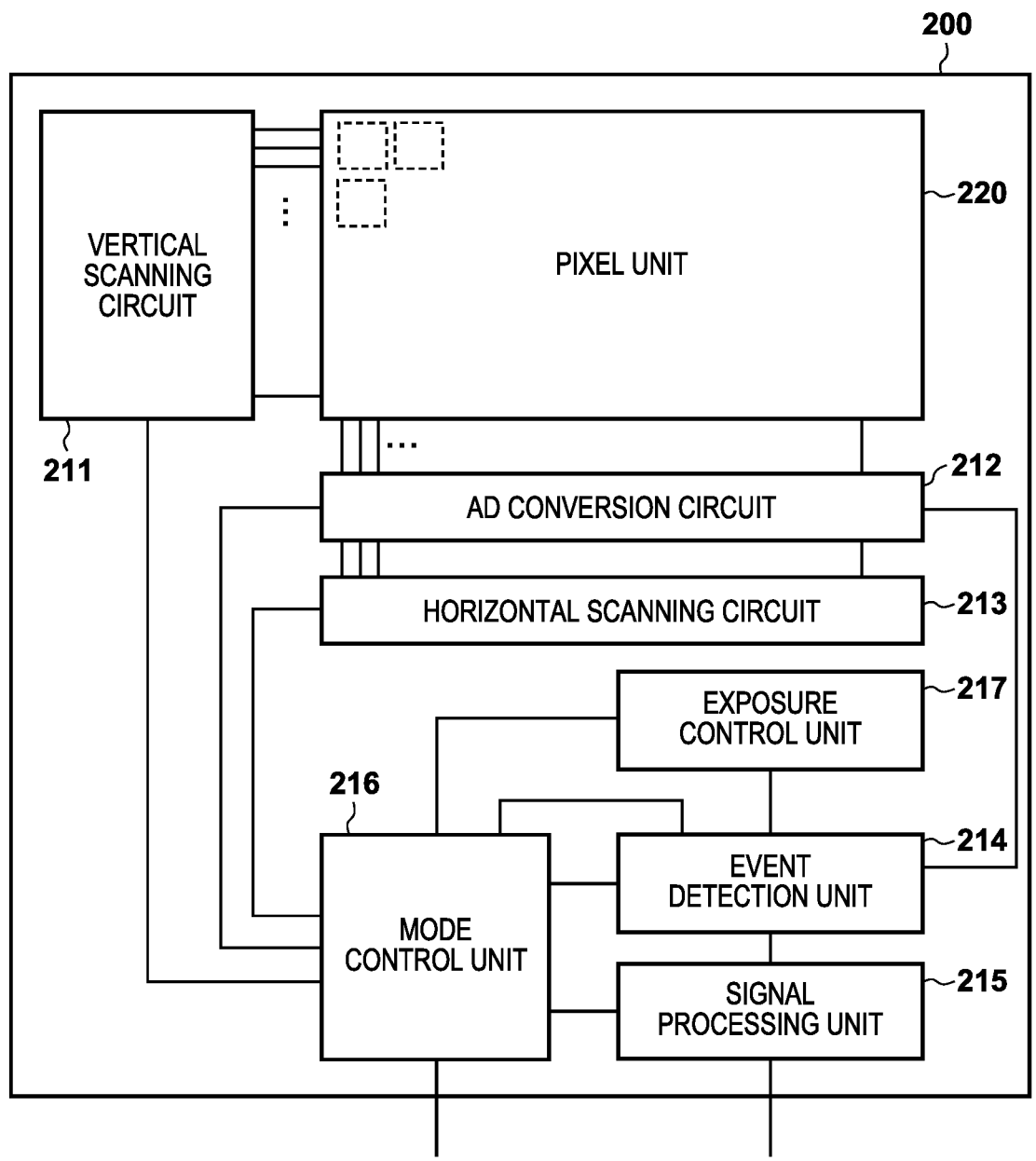
FIG. 2 is a block diagram illustrating a functional configuration example of an imaging device according to a present embodiment.

A functional configuration example of the imaging device 200 according to the present embodiment will now be described in more detail with reference to FIG. 2. The imaging device 200 includes a pixel unit 220 in which a plurality of pixels are arranged in a matrix (i.e., a two-dimensional pattern). The imaging device 200 has a function of outputting image signals composed of pixel signals output in pixel units of the pixel unit 220 and image signals composed of pixel signals obtained by adding signals of multiple pixels in units of pixel blocks (blocks obtained by dividing the plane of the pixel unit 220 in a predetermined manner).

The pixel signals output from the pixel unit 220 are subjected to analog-to-digital conversion by an AD conversion circuit 212 for each pixel column or each block column, which is a pixel block unit as described below. The converted pixel signals are then sequentially transferred to an event detection unit 214 through driving of a horizontal scanning circuit 213.

The event detection unit 214 detects a predetermined event from the input pixel signals or outputs the input pixel signals directly to the signal processing unit 215 in accordance with a control signal from the mode control unit 216 that performs drive mode control of the imaging device 200. That is, the event detection unit 214 functions as detecting unit that detects, in the pixel signals input in pixel block units, the blocks in which a subject image has changed among the plurality of pixel blocks. The event detection unit 214 transmits the amount of change in the pixel signals to the mode control unit 216 as a detection result, integrates the pixel signals in pixel block units, and feeds the integrated data to an exposure control unit 217. For pixel signals input in pixel units (i.e., in each pixel column), the event detection unit 214 outputs these pixel signals directly to the signal processing unit 215.

The signal processing unit 215 adds additional information indicating the amount of change in pixel signals or the like to at least one of leading end and trailing end of the pixel signals output from the event detection unit 214 and outputs these image signals to an external unit of the imaging device 200. The image signals output to an external unit of the imaging device 200 can be recorded as a captured image in the recording unit 105.

The mode control unit 216 receives signals from the event detection unit 214 in the imaging device 200 or the control unit 103 outside the imaging device 200, and feeds driving timing control signals to the AD conversion circuit 212, the horizontal scanning circuit 213, and a vertical scanning circuit 211. In this way, the mode control unit 216 performs drive control in accordance with the imaging mode of the imaging device 200. When the control unit 103 permits the imaging device 200 to operate in the detection mode (as the operation mode thereof), the mode control unit 216 sets the imaging device 200 to the detection mode and starts driving to add pixel signals in each pixel block.

The vertical scanning circuit 211 selects and drives rows in pixel units or pixel block units via signal lines connected to the respective rows. The exposure control unit 217 calculates an exposure time as exposure control of the imaging device 200 on the basis of the integrated data from the event detection unit 214, and feeds an exposure control signal of the imaging device 200 to the mode control unit 216.

Configuration of Pixel Unit 220

A configuration example of the pixel unit 220 according to the present embodiment will now be described with reference to FIG. 3A. In the pixel unit 220, multiple pixels 230 are arranged in a 6×6 matrix (i.e., a two-dimensional pattern). The example of FIG. 3A includes, for example, 6×6 or 36 pixels 230. Note that the number of rows and columns and the arrangement are not limited thereto. For the purpose of illustration, the pixels 230 are denoted by numbers indicating their positions in the pixel matrix.

The pixels 230 each output a pixel signal. When the imaging device 200 is in the normal image capturing mode, pixel signals in pixel units are output from the pixel unit 220.

When the imaging device 200 is in the detection mode, the pixel signals of a plurality of pixels in a predetermined pixel block (partial region) in the plane of the imaging device 200 are added and output from the pixel unit 220.

In the example illustrated in FIG. 3A, pixel blocks 240 are each serving as a block unit and composed of four pixels (4×4 matrix) in the row and column directions, and each pixel block 240 has an overlapping region (of 2 pixels) with adjacent pixel blocks. That is, four adjacent pixel blocks 240 have overlapping regions.

Figure 3B:
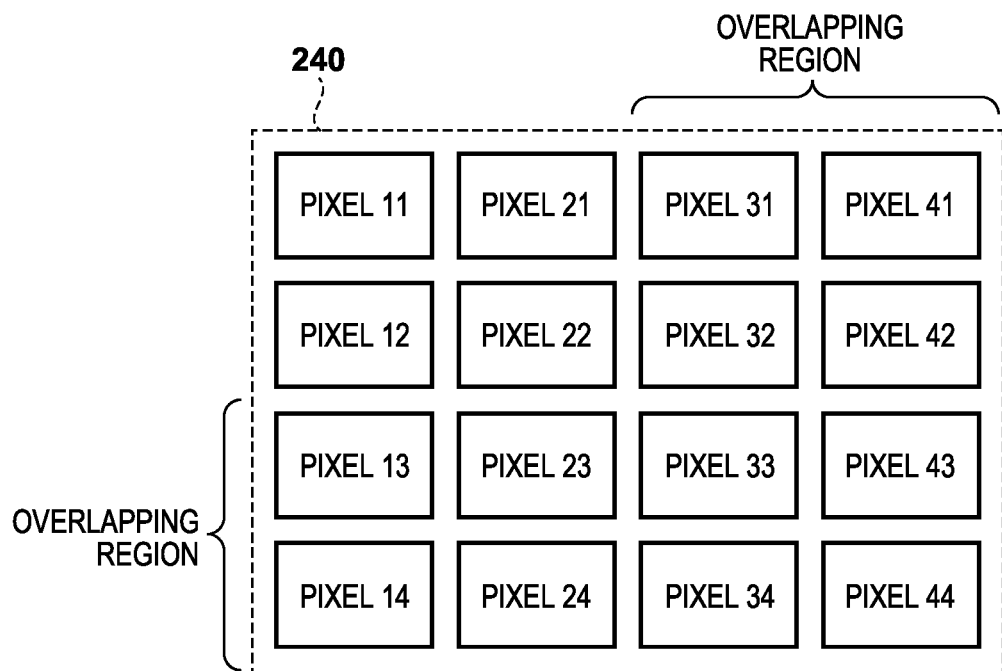
FIG. 3BA is a diagram illustrating an example of the range of a pixel block (partial region) of a pixel unit according to a present embodiment.
Figure 3B:
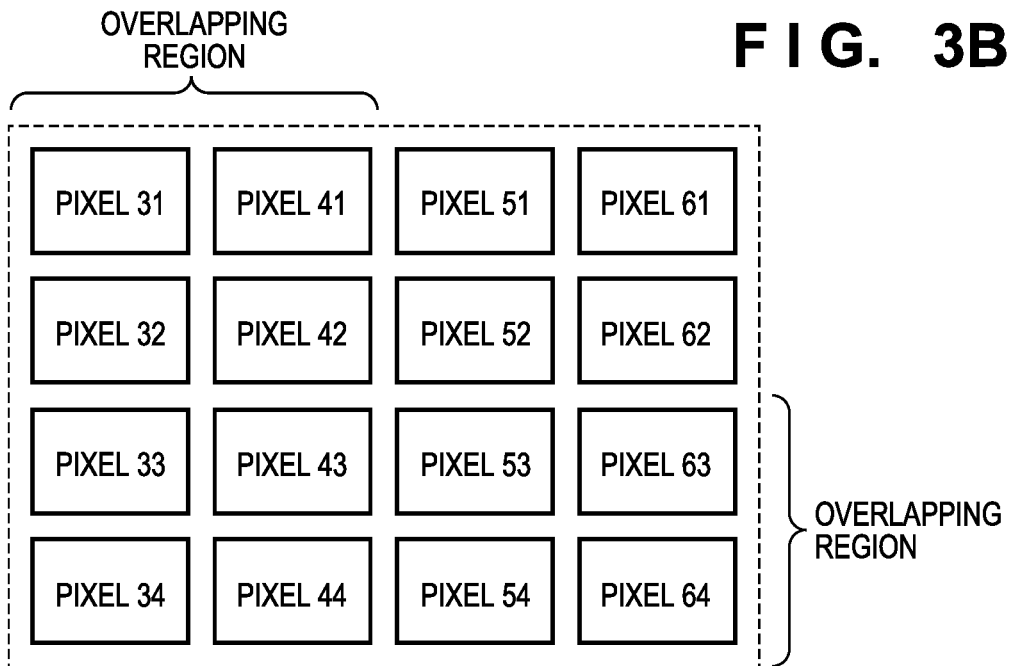
Figure 3B:
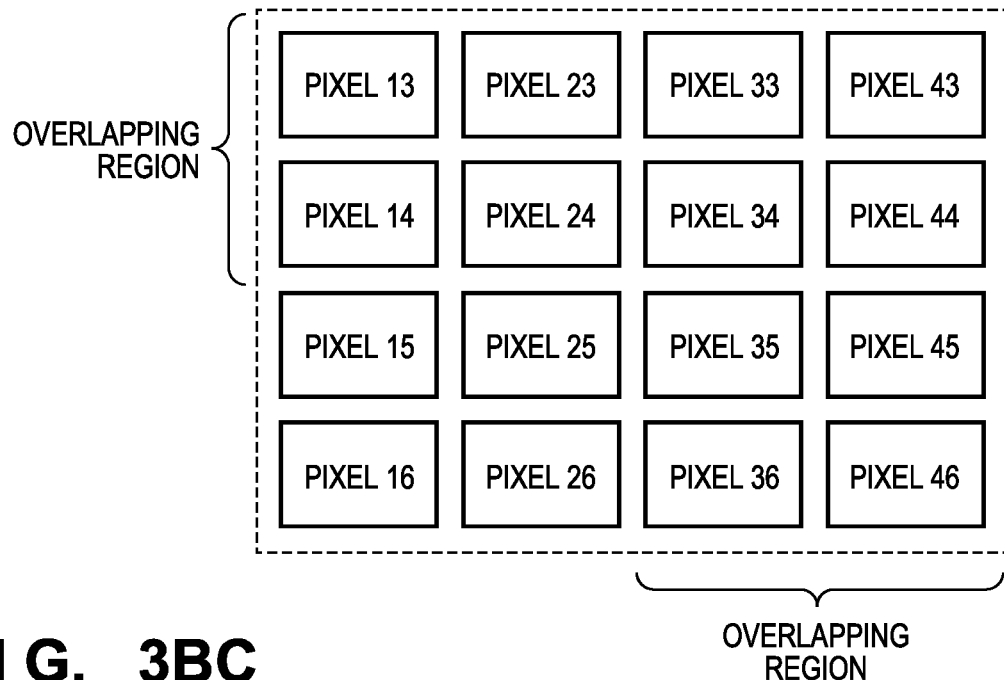
Figure 3B:
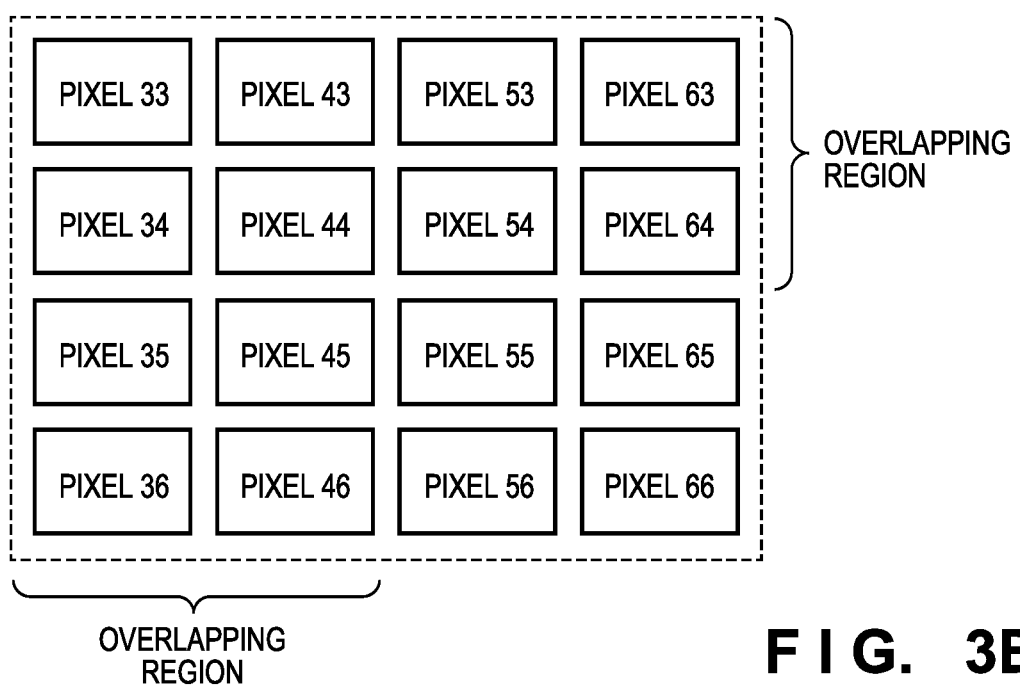

FIGS. 3BA, 3BB, 3BC, and 3BD individually represent each of the four pixel blocks 240. FIG. 3BA illustrates the pixel block positioned at the upper left of the imaging plane on the pixel unit 220, FIG. 3BB illustrates the upper right, FIG. 3BC illustrates the lower left, and FIG. 3BD illustrates the lower right.

As illustrated in FIG. 3BA, the pixel block 240 at the upper left of the imaging plane adds the pixel signals in the region in which the pixel 11 in the first row and the pixel 44 in the fourth row of the pixel unit 220 are positioned at the upper left and the lower right, respectively, to obtain an output in units of one block.

As illustrated in FIG. 3BB, the pixel block 240 at the upper right of the imaging plane adds the pixel signals in the region in which the pixel 31 in the first row and the pixel 64 in the fourth row of the pixel unit 220 are positioned at the upper left and the lower right, respectively, to obtain an output in units of 1 block.

As illustrated in FIG. 3BC, the pixel block 240 at the lower left of the imaging plane adds the pixel signals in the region in which the pixel 13 in the third row and the pixel 46 in the sixth row of the pixel unit 220 are positioned at the upper left and the lower right, respectively, to obtain an output in units of one block.

As illustrated in FIG. 3BD, the pixel block 240 at the lower right of the imaging plane adds the pixel signals in the region in which the pixel 33 in the third row and the pixel 66 in the sixth row of the pixel unit 220 are positioned at the upper left and the lower right, respectively, to obtain an output in units of one block.

Each of the pixel blocks 240 is provided with an overlapping region of two rows and two columns with respect to pixel columns and pixel rows in adjacent pixel blocks 240. For example, in the pixel block 240 positioned at the upper left, an overlapping region is provided in the column direction relative to the pixel block 240 positioned at the upper right, and the overlapping region includes the pixels 31 to 34 and 41 to 44. The pixel block 240 positioned at the lower left is provided with an overlapping region in the row direction, and the overlapping region includes the pixels 13 to 43 and 14 to 44.

Referring back to FIG. 3A, various control signals are fed to each pixel 230 in the first row via a plurality of signal lines wired in the row direction. That is, a reset control signal (e.g., RST1) and a row selection control signal (e.g., SEL1-1, SEL2-1) are fed. Moreover, a transfer control signal (e.g., TX1) and an addition signal (e.g., ADD1) are also fed. Similar control signals are also fed to the pixels 230 in the second and subsequent rows.

In the column direction, two vertical signal lines (for example, vertical signal lines 410-1 and 412-1) are wired to each pixel column. An output (i.e., a pixel signal) from each pixel 230 in the same pixel column is input to the AD conversion circuit 212 that is the connection destination via a vertical signal line.

The selective feeding of the control signals by the signal lines described above causes the imaging device 200 to sequentially output pixel signals in column units via the respective vertical signal lines 410. When the operation mode is the normal image capturing mode, pixel signals are sequentially output from each of the pixels 230 of the pixel unit 220. In contrast, when the operation mode is the detection mode, pixel signals obtained by addition in units of the pixel blocks 240 are output.

The pixel signals are output in units of the pixel blocks 240 by operating an addition switch described below in row units in the pixel blocks to add signals of floating diffusions, and signals are output to the vertical signal lines in row units at the same time. In this way, the pixel signals of the pixel blocks added in block units are output from the row units.

Figure 4A:
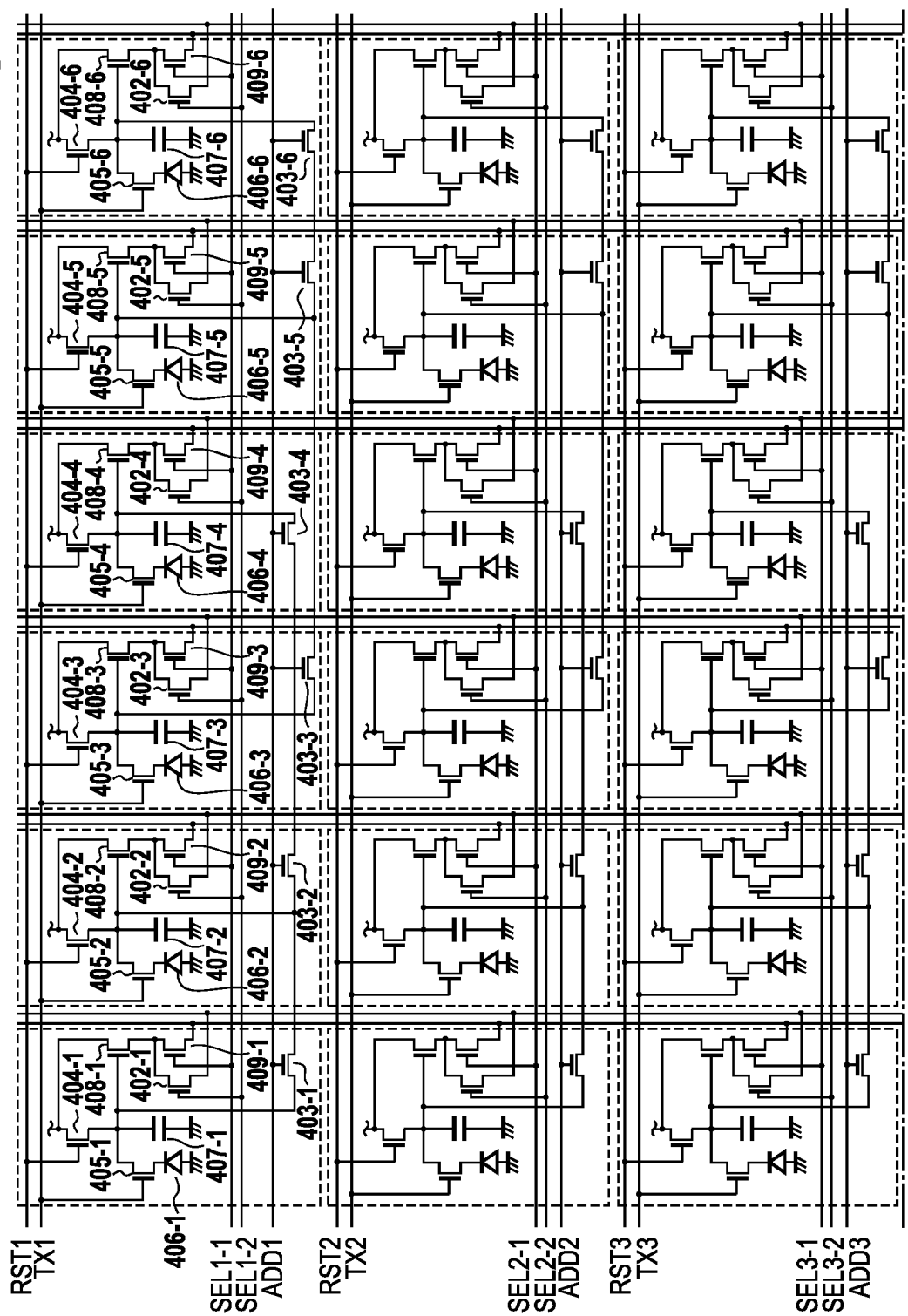
FIG. 4A is a diagram illustrating a configuration example of a pixel block according to a present embodiment.
Figure 4B:
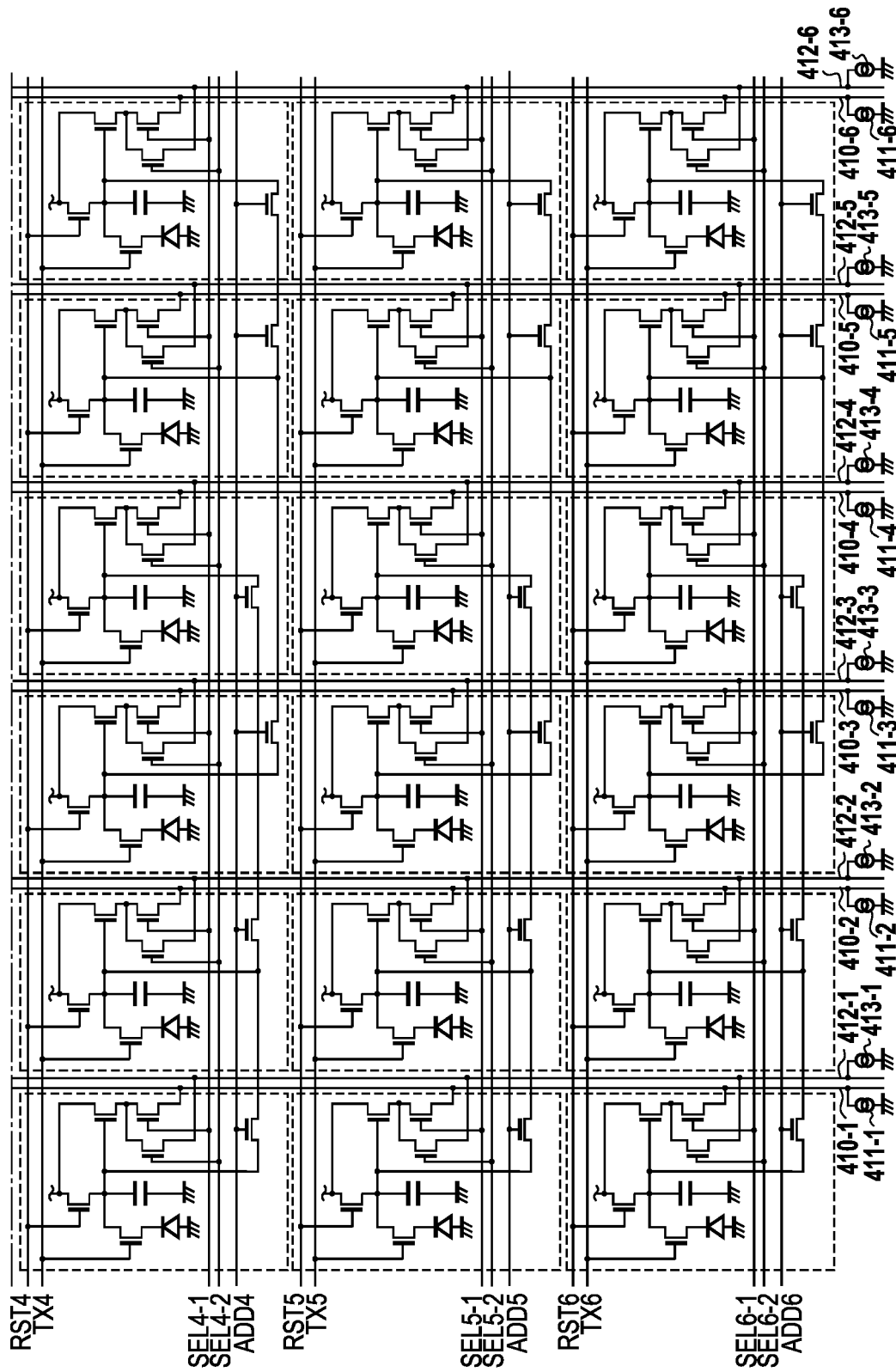
FIG. 4B is a diagram illustrating a configuration example of a pixel block according to a present embodiment.

A configuration example of the pixel unit 220 according to the present embodiment will now be described with reference to FIGS. 4A and 4B. FIGS. 4A and 4B illustrate examples in which 6×6 pixels 230 are arranged.

With focus on one pixel 230 positioned at the upper left, the charge generated and accumulated in a photodiode 406-1 is transferred to a floating diffusion (FD) 407-1 through control of a transfer switch 405-1 by a transfer control signal TX1.

A source follower amplifier 408-1 amplifies a voltage signal based on the charge stored in the FD 407-1 and outputs it as a pixel signal. The source follower amplifier 408-1 is configured together with a vertical signal line 410-1 and a constant current source 411-1 connected to the vertical signal line 410-1. The output of the source follower amplifier 408-1 is connected to a vertical signal line 410-1 through control of a row selection switch 409-1 by a row selection control signal SEL1-1.

The source follower amplifier 408-1 is also configured together with a vertical signal line 412-1 and a constant current source 413-1 different from the vertical signal line 410-1 and the constant current source 411-1 described above. The source follower amplifier 408-1 then amplifies a voltage signal based on the charge stored in the FD 407-1 and outputs it as a pixel signal. The output of the source follower amplifier 408-1 is connected to the vertical signal line 412-1 different from the vertical signal line 410-1 described above through control of a row selection switch 402-1 by a row selection control signal SEL1-2.

When an unnecessary charge stored in the FD 407-1 is to be reset, a reset switch 404-1 is controlled by a reset control signal RST1. When the charge of the photodiode 406-1 is to be reset, the transfer control signal TX1 is controlled to control the transfer switch 405-1 together with the reset switch 404-1, to execute the reset. The transfer control signals (e.g., TX1), the reset control signals (e.g., RST1), and the row selection control signals (e.g., SEL1-1, SEL1-2) are fed from the vertical scanning circuit 211 and have control signal values for each row.

When the operation mode of the imaging device 200 is the normal image capturing mode, a signal transferred to the FD 407 (e.g., the FD 407-1) in each pixel 230 is output from each pixel (e.g., 230-1). In contrast, when the operation mode is the detection mode, signals transferred to the FDs (407-1, 407-2, 407-4) of the respective pixels are added and averaged by short-circuiting the FDs by controlling addition switches 403-1, 403-2, and 403-4 by an addition signal ADD1. Adding and averaging are also performed for other rows in the pixel block by the FDs in row units.

Subsequently, the signals obtained by adding and averaging in row units are simultaneously output to the same vertical signal line to be an output in pixel block units. In this way, the result of the adding and averaging the pixel block units, which each consist of 4×4 pixels, by the FDs and the vertical signal line is output in the detection mode. However, the range of addition is not limited to 4×4. The horizontal addition of pixel signals is not limited to the addition by the FDs. and alternatively, for example, output signals from multiple rows may be simultaneously output to a vertical signal line to add and average the output signals, and vertical addition may be performed by providing an addition circuit in front of the AD conversion circuit.

Configuration of Event Detection Unit 214

Figure 5:
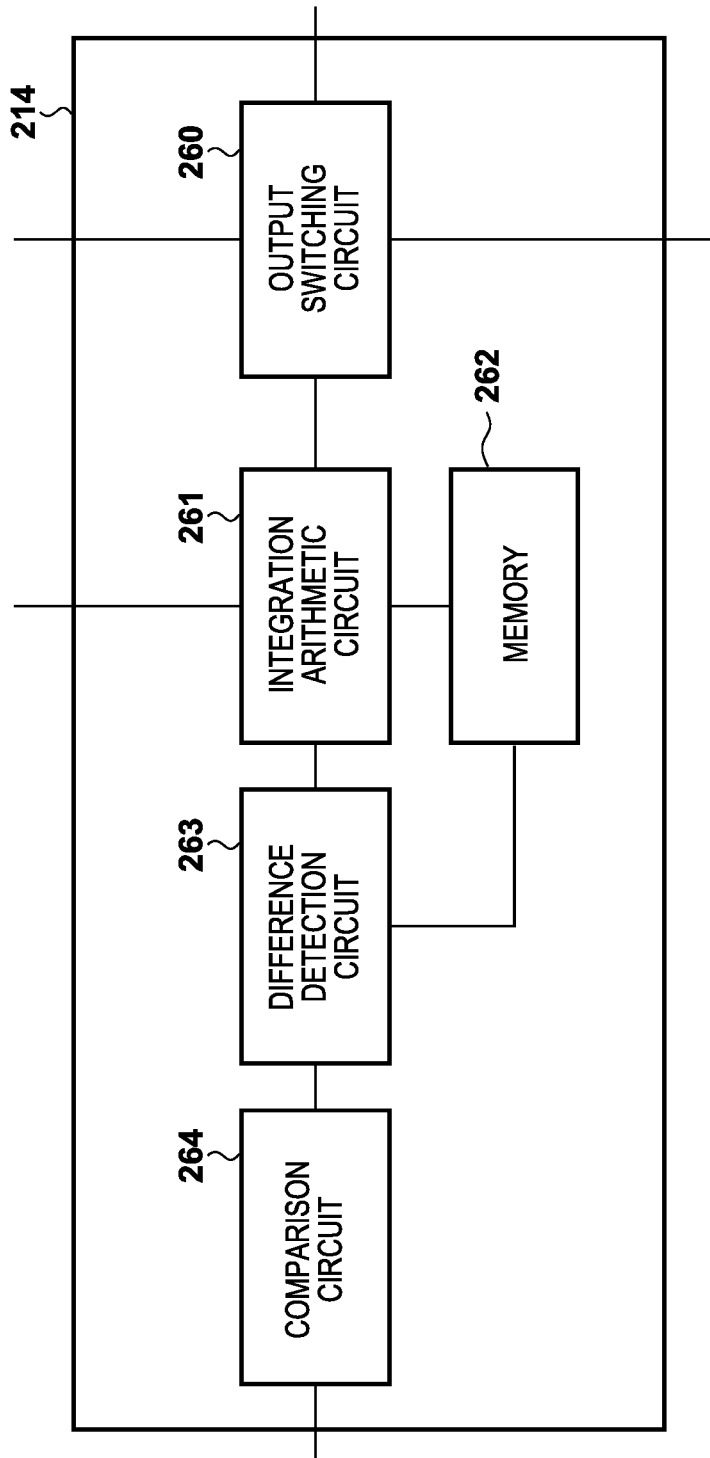
FIG. 5 is a block diagram illustrating a functional configuration example of an event detection unit according to a present embodiment.

A configuration example of the event detection unit 214 according to the present embodiment will now be described with reference to FIG. 5. An output switching circuit 260 is a circuit for switching the pixel output destination to either the inside or the outside of the imaging device 200 in accordance with the operation mode of the imaging device 200.

The output switching circuit 260 receives a control signal from the mode control unit 216, and when the operation mode of the imaging device 200 is the detection mode, sets the output destination of the pixel signals to an integration arithmetic circuit 261 inside the imaging device 200 and causes detection of a change in the subject image. When the operation mode of the imaging device 200 is the normal image capturing mode, the output destination of the pixel signals is set to an external unit of the imaging device 200, and the pixel signals are output from the event detection unit 214 to the signal processing unit 215.

The integration arithmetic circuit 261 receives the output of the pixel signals from the output switching circuit 260, integrates the output values, and feeds the integrated data to the exposure control unit 217. The integration arithmetic circuit 261 outputs the pixel output in pixel block units to a memory 262 for holding the pixel output. The memory 262 stores and holds, as past data, pixel signals in pixel block units acquired in a fixed cycle (for example, every frame) and information indicating the division positions of a two-dimensional matrix in the plane of the imaging device that is the output source of the signals.

A difference detection circuit 263 compares signal values of pixel signals of a pixel block unit read most recently at a same division position with signal values of pixel signals in past data held in the memory 262 to generate difference data. The difference detection circuit 263 feeds the generated difference data to a comparison circuit 264. The comparison circuit 264 compares each piece of the fed difference data with a predetermined threshold value, and transmits the obtained comparison result data to the mode control unit 216.

Figure 6A:
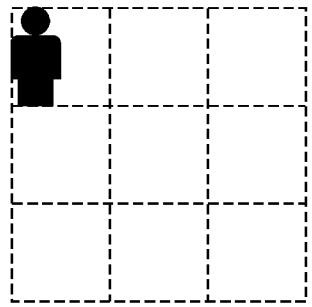
FIG. 6A is a diagram illustrating an example of a subject image on an imaging plane according to a present embodiment.
Figure 7A:
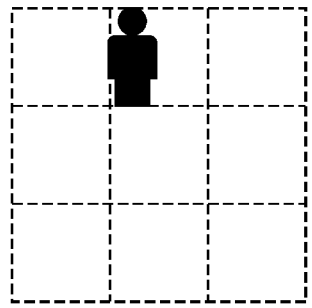
FIG. 7A is a diagram illustrating an example of a subject image on an imaging plane that has shifted according to a present embodiment.

FIGS. 6A and 7A illustrate examples of captured subject images, and in these examples, a person who is the subject is positioned in the upper left block in the imaging plane.

Figure 6B:
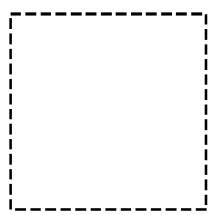
FIG. 6B is a diagram illustrating the size of a pixel block region according to a present embodiment.

FIG. 6B illustrates the size of each pixel block region, and the size of each pixel block region is the same. Although the present embodiment describes an example in which the size of each pixel block area is the same, the size of the pixel block region may be varied in accordance with an instruction operation by a user or in accordance with the size of the subject, frame interval, etc.

In FIG. 6A, as described with reference to FIG. 3B, each pixel block overlaps the adjacent pixel block and a portion of the region thereof. The broken lines in the drawing indicate regions of the pixel blocks. In the following description, the positions of the pixel blocks will be described by representing the row as a number on the left and the column as a number on the right as represented by position 11 at the upper left, position 12 to the right, and so on up to position 22 at the lower right.

Figure 6C:
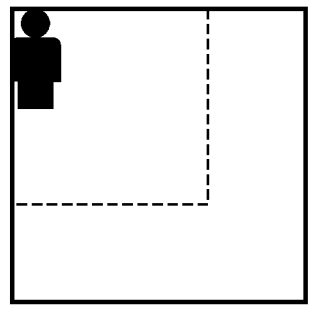
FIG. 6C is a diagram illustrating an adjacent pixel block according to a present embodiment.
Figure 6D:
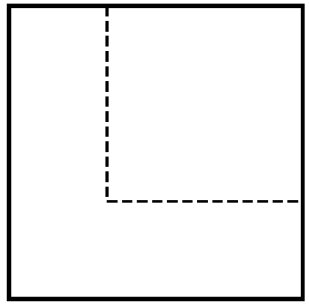
FIG. 6D is a diagram illustrating an adjacent pixel block according to a present embodiment.
Figure 6E:
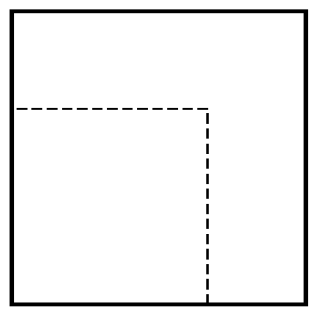
FIG. 6E is a diagram illustrating an adjacent pixel block according to a present embodiment.
Figure 6F:
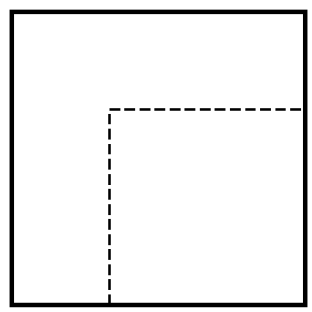
FIG. 6F is a diagram illustrating an adjacent pixel block according to a present embodiment.

FIGS. 6C, 6D, 6E, and 6F illustrate the individual regions of the subject image and the respective pixel blocks on the image capturing plane in FIG. 6A. FIG. 6C illustrates a pixel block 11 at the upper left, FIG. 6D illustrates a pixel block 12 at the upper right, FIG. 6E illustrates a pixel block 21 at the lower left, and FIG. 6F illustrates a pixel block 22 at the lower right. Here, focusing on the pixel block 11, regions overlapping the pixel block 12 on the right side, the pixel block 21 on the lower side, and the pixel block 22 on the lower right side are provided.

Figure 6G:
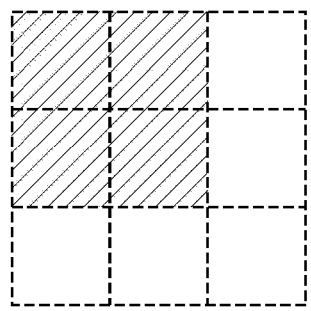
FIG. 6G is a diagram illustrating an example of pixel signals obtained for a subject image.

FIG. 6G schematically illustrates the output from each pixel block 240 of the pixel unit 220 corresponding to the subject image illustrated in FIG. 6A. The output from the pixel block (block 11) corresponding to the person portion in FIG. 6A is an output obtained by adding the signals the pixels at where the person and the background are positioned. The example illustrated in FIG. 6A indicates a case where the background is brighter than the person. Therefore, the output of the pixel block 11 has a lower signal value than the output of the other pixel blocks on the basis of the ratio of area of the person to the area of the background.

FIG. 7A illustrates an example of a subject image in the imaging plane, similar to FIG. 6A. In comparison with FIG. 6A, FIG. 7A illustrates a case in which the subject image moves from left to right in the region of the pixel block 11. In the example illustrated in FIG. 7A, the subject image is positioned in the overlapping region of the pixel blocks 11 and 12. That is, although the subject image is positioned in the region in the pixel block 11, it is also positioned at the left end in the region of the pixel block 12.

Figure 7B:
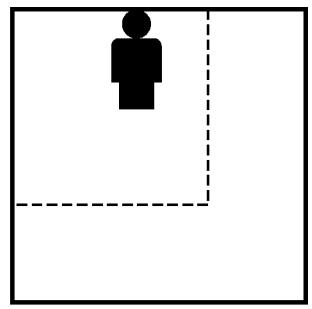
FIG. 7B is a diagram illustrating the relationship between a subject image and a pixel block region according to a present embodiment.
Figure 7C:
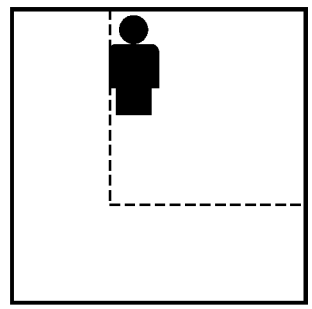
FIG. 7C is a diagram illustrating the relationship between a subject image and a pixel block region according to a present embodiment.
Figure 7D:
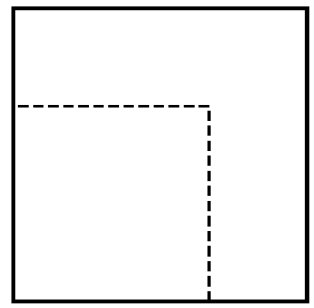
FIG. 7D is a diagram illustrating the relationship between a subject image and a pixel block region according to a present embodiment.
Figure 7E:
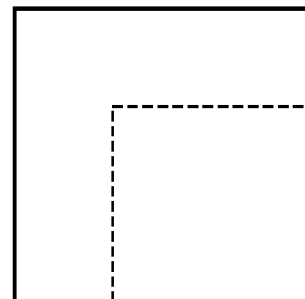
FIG. 7E is a diagram illustrating the relationship between a subject image and a pixel block region according to a present embodiment.

FIGS. 7B, 7C, 7D, and 7E illustrate the individual regions of the subject image and the respective pixel blocks on the image capturing plane in FIG. 7A. FIG. 7B illustrates a pixel block 11 at the upper left, FIG. 7C illustrates a pixel block 12 at the upper right, FIG. 7D illustrates a pixel block 21 at the lower left, and FIG. 7E illustrates a pixel block 22 at the lower right.

Figure 7F:
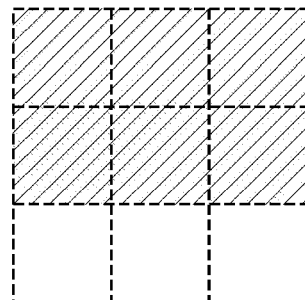
FIG. 7F is a diagram illustrating an example of pixel signals obtained for a subject image.

FIG. 7F schematically illustrates the output of each pixel block corresponding to the subject image in FIG. 7A. Since the subject is positioned in the overlapping region, both pixel blocks 11 and 12 provide low output values to the pixel blocks 21 and 22.

The operation of when the position of the subject image changes from that in FIG. 6A to that in FIG. 7A will now be explained. The difference detection circuit 263 calculates difference data at the same division position for each pixel block from the pixel signals of the pixel block units illustrated in FIG. 6G held in the memory 262 as past data and the pixel signals of the pixel block units illustrated in FIG. 7F read most recently.

The comparison circuit 264 then compares the calculated difference data with a predetermined threshold value. That is, the comparison circuit 264 determines whether a change in the subject image has occurred on the basis of the calculated difference data and the predetermined threshold value (the threshold value will be described below). That is, in the example of a change from FIG. 6A to FIG. 7A, when the difference data between the pixel signal illustrated in FIG. 6G and the pixel signal illustrated in FIG. 7F exceeds a threshold value, a change in the subject image is detected. Subsequently, when a change in the subject image is detected in a pixel block, the mode control unit 216 changes drive control to a normal image capturing mode for an image.

FIGS. 8A and 8B illustrate an example in which the imaging plane is divided into 2-2 pixel blocks that have no overlapping region by using a conventional technique. In this example, the positions of the person illustrated in FIGS. 8A and 8B are the same as those in FIGS. 6A and 7A, respectively.

FIG. 8C schematically illustrates an output from the pixel block in the case where a conventional technique is used. In the drawing, the output resulting from a change in the subject image is no different from the case where the subject exists in the pixel block 11. That is, unlike the case w % here the overlapping regions are provided as in the above-described embodiment, a difference in output is not obtained for a shift of the subject within a divided block, and a change in the subject image cannot be detected.

Thus, in the present embodiment, overlapping adjacent pixel blocks causes a small shift of the subject image to appear in the pixel signals of the adjacent pixel blocks. A larger overlapping region of the adjacent pixel blocks enables detection of a smaller shift of the subject image. In the above example, pixel blocks adjacent to each other in the row direction or the column direction overlap each other in one-half of the regions of the pixel blocks. In such a case, a shift of the subject image by a distance of half a pixel block causes a change to appear in the pixel signals of the adjacent pixel blocks. That is, in comparison with the case illustrated in FIGS. 8A to 8C, a change in the subject image shifting by half the distance can be detected.

Since the pixel signal read from each pixel block is a signal in which the number of pixels is reduced by pixel addition, the operation power consumption for detecting a change in the subject image can still be reduced. That is, the detection accuracy for detecting a change in the subject image can be enhanced while the operation power consumption for detecting a change in the subject image is reduced.

On the other hand, a larger overlapping region of adjacent pixel blocks causes an increase in the number of pixel blocks disposed on the imaging plane, so that the number of pixel signals read from each pixel block (for detecting a change in the subject image) increases. Therefore, for example, when the pixel blocks adjacent in the row direction or the column direction overlap in half of the region of the pixel blocks, the reduction of the operation power consumption for detecting a change in the subject image and the enhancement of the detection accuracy for detecting a change in the subject image can be balanced.

Figure 9:
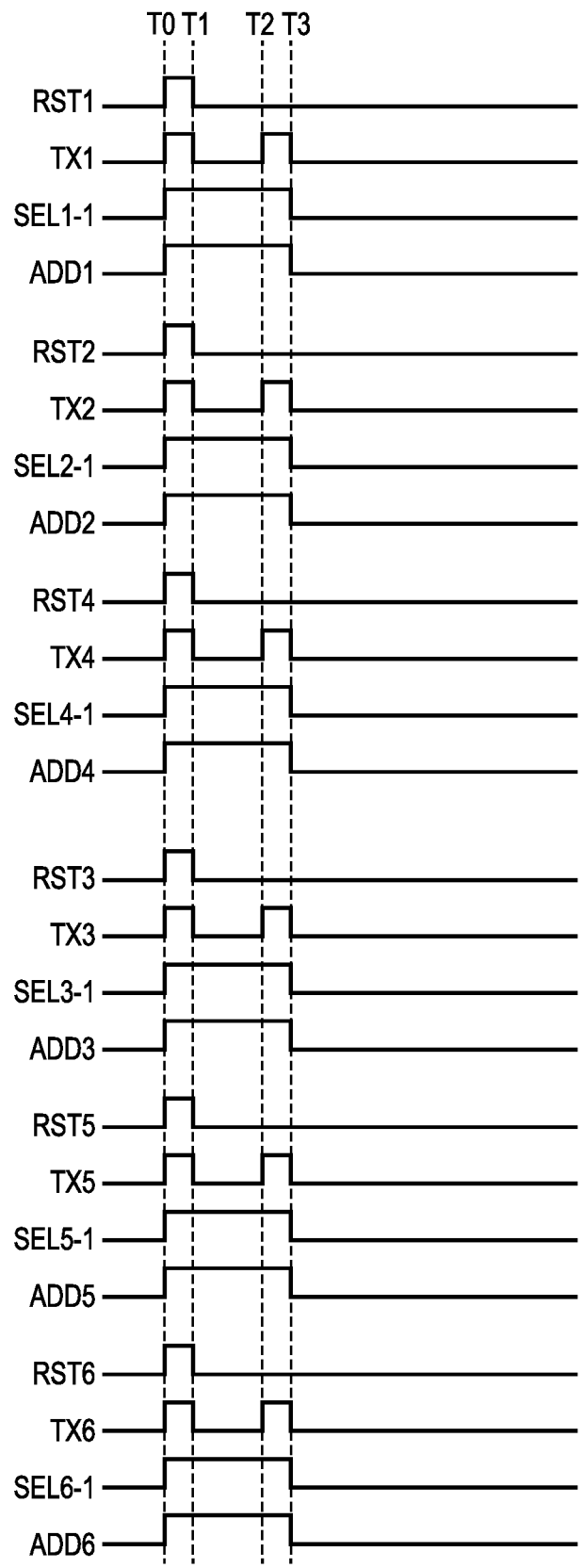
FIG. 9 is a timing chart illustrating an operation example of an imaging device according to a present embodiment in a detection mode.

A reading operation of pixel signals in pixel block units during operation in the detection mode will now be explained with reference to FIG. 9.

It is presumed that at timing T0, an event is detected, the control unit 103 permits the imaging device 200 to operate in the detection mode, and the detection mode is set. The vertical scanning circuit 211 sets the addition signal ADD1 for performing signal addition control in row units of the pixel block to a high level, thereby the FD is short-circuited in row units in the block, and the pixel signals are added and averaged.

At the same timing T0, the vertical scanning circuit 211 controls the reset control signal RST1 and the transfer control signal TX1 to a high level. This resets the FDs 407-1, 407-2, and 407-4 in a connected state by the addition signal ADD1 to the power supply potential. The control signal resets the photodiodes 406-1, 406-2, and 406-4 in the same row to a power supply potential.

The second and fourth rows to be added in the same pixel block also operate in the same manner as the first row. For example, tin the second row, the vertical scanning circuit 211 controls the reset control signal RST2 and the transfer control signal TX2 to a high level. In such a case, the FD in the second row is short-circuited by an addition signal ADD2 and reset. In the fourth row, the vertical scanning circuit 211 controls the reset control signal RST4 and the transfer control signal TX4 to a high level, and the FD in the fourth is short-circuited by the ADD4 and reset.

At timing T1, the reset control signal RST1 and the transfer control signal TX1 return to a low level, and exposure of the pixels is started in the first row in block units. Similarly, in the second row, the reset control signal RST2 and the transfer control signal TX2 return to a low level, and exposure of the pixels is started in the second row in block units. In the fourth row, the reset control signal RST4 and the transfer control signal TX4 return to a low level, and exposure of the pixels is started in the fourth row in block units.

At timing T2, after a certain exposure time has elapsed, the vertical scanning circuit 211 controls the transfer control signal TX1 corresponding to the first row in block units to a high level to turn on the transfer switches 405-1, 405-2, and 405-4. This transfers the charges stored in the respective photodiodes 406-1, 406-2, and 406-4 to the floating diffusions (FDs). This completes the exposure of the block units in which the charges are combined.

Simultaneously, in the second row in block units, the transfer control signal TX2 is controlled to a high level to turn on the transfer switch of the second row, and the charges accumulated in the respective photodiodes in the second row are transferred to the FDs. In the fourth block unit, the transfer control signal TX4 is controlled to a high level to turn on the transfer switch of the fourth row, and the charges accumulated in the respective photodiodes in the fourth row are transferred to the FDs.

The charges of block units transferred to the FDs are amplified as voltage signals by the source follower amplifier 408-1 and output as pixel outputs from the vertical signal line 410-1. The pixel outputs to the vertical signal lines are converted into digital signals by the AD conversion circuit.

The operation up to this point causes the first row of the block as a pixel block unit to output the pixel signals of each column from one vertical signal line of the two vertical signal lines, but the output of the pixel signals of the pixel block is converted into a digital signal by one AD conversion circuit that becomes effective.

In the second row of the block as a pixel block unit, as in the first row of the block, the FD of each column is short-circuited and the pixel signals are added and averaged in row units of the block. The output signal of this row unit is output to the vertical signal line to be an output signal in a pixel block unit; and the output signal is output to another vertical signal line (for example, 412-1) different from the first row of the block, and is converted into a digital signal by one AD conversion circuit. By outputting pixel signals by a different vertical signal line for each block, the pixel signals can be read from the respective blocks in a state of high synchronism.

Similarly, at and after timing T3, exposure and reading are sequentially performed in block units, thereby completing the reading of all blocks. The reading of all the blocks is executed multiple times in accordance with the vertical synchronization signals.

Figure 10:
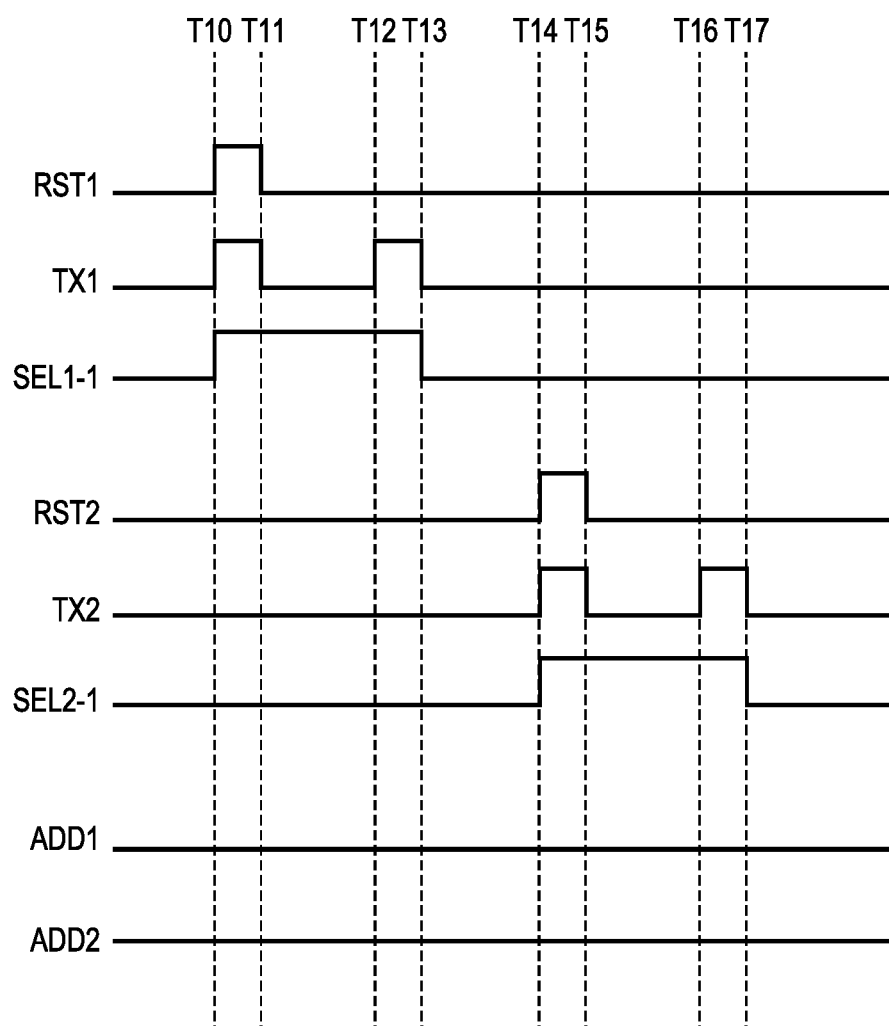
FIG. 10 is a timing chart illustrating an operation example of an imaging device according to a present embodiment in a normal image capturing mode.

A reading operation of pixel signals in pixel units during operation in the normal image capturing mode will now be explained with reference to FIG. 10.

It is presumed that, at timing T10, an event is detected (for example, the event detection unit 214 detects a change in the subject image illustrated in FIG. 7A), and the normal image capturing mode.

The vertical scanning circuit 211 controls the row selection control signal SEL_1 to a high level and the reset control signal RST1 to a high level during a predetermined pulse period in order to read the pixel signals of the first pixel row.

At the same timing T10, the vertical scanning circuit 211 controls the reset control signal RST1 and the transfer control signal TX1 to a high level. This resets the FDs 407-1 to 407-6 and the photodiodes 406-1 to 406-6 of the pixels in the first row to the power supply potential. Since the vertical scanning circuit 211 does not read pixel signals in block units in the normal image capturing mode, the addition signals ADD1 and ADD2 are not set to a high level.

At timing T11, under the control of the vertical scanning circuit 211, the reset control signal RST1 and the transfer control signal TX1 return to a low level, and exposure is started for the first pixel row. At timing T12, after a certain exposure time has elapsed, the vertical scanning circuit 211 controls the transfer control signal TX1 to a high level to turn on the transfer switches 405-1 to 405-6. This transfers the charges stored in the photodiodes 406-1 to 406-6 are transferred to the FDs 407-1 to 407-6, respectively, and the exposure of the pixels in row units ends.

The charges transferred to the FDs are amplified as voltage signals by the source follower amplifiers 408-1 to 408-6 that are the connection destinations and are output as pixel signals from the vertical signal lines of the columns. The pixel signals output to the vertical signal lines are converted into digital signals by the AD conversion circuit of each column.

In the next timings T14 to T17, a signal reading operation of the pixels in the second row is performed. In the reading of the signals, the row selection control signal SEL2-1, the reset control signal RST2, and the transfer control signal TX2 corresponding to the pixels in the second row are driven and controlled in the same manner as the same signals of the pixels in the first row. This transfers the charges stored in the photodiodes of the second row to the FDs of the second row, and the exposure of the pixels in the second row in pixel units ends. The charges transferred to the FDs are amplified as voltage signals by the source follower amplifiers that are the connection destinations and are output as pixel signals from the vertical signal lines of the columns.

Similarly, for the subsequent pixel rows, exposure and reading are performed in pixel row units, thereby completing the reading of all rows. The reading of all the rows is executed multiple times in accordance with the vertical synchronization signals.

Figure 11:
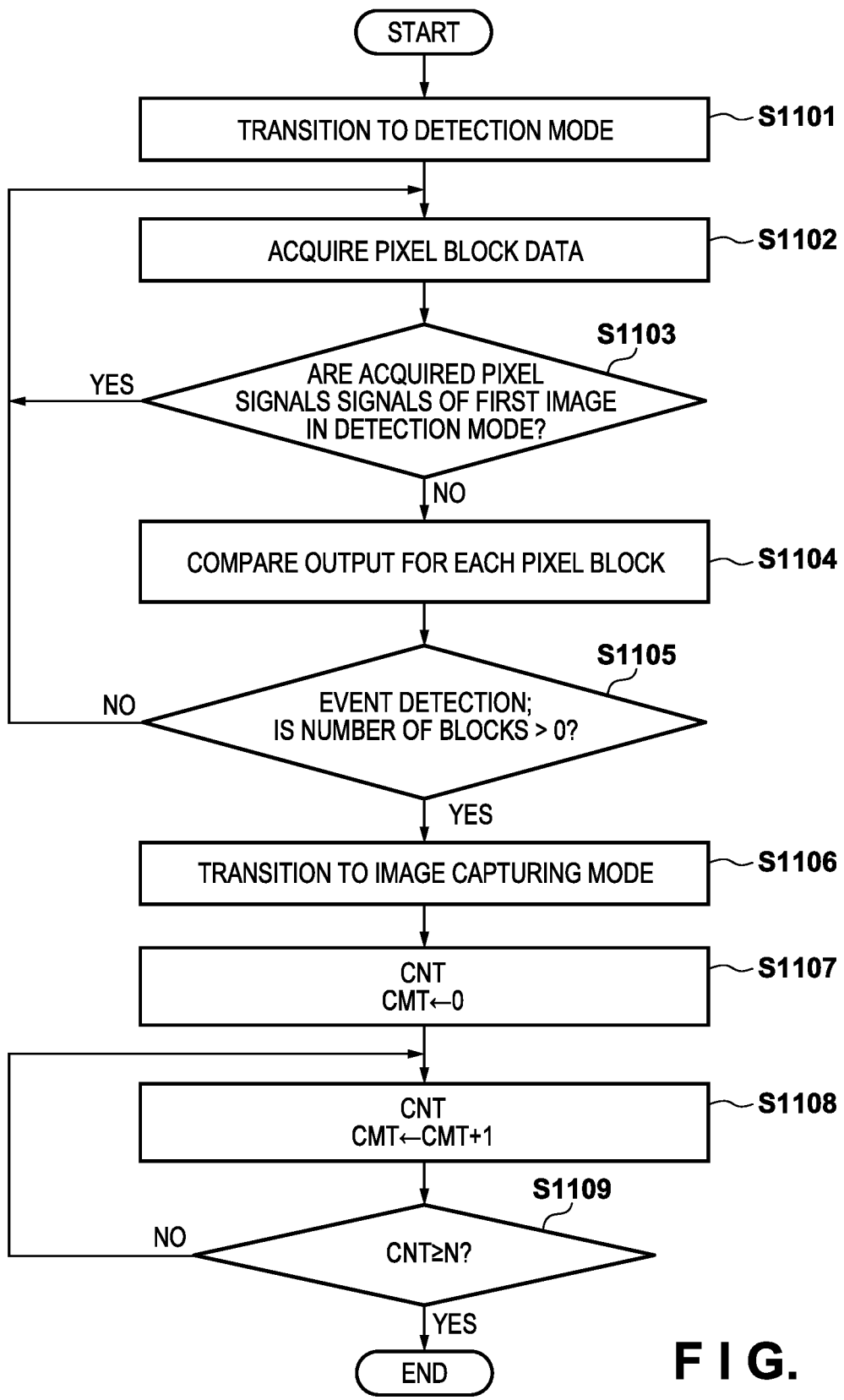
FIG. 11 is a flowchart illustrating a series of operations involving an operation mode of an imaging device according to a present embodiment.

Series of Operations Involving Normal Image Capturing Mode Control of Imaging Device A series of operations involving normal image capturing mode control of the imaging device 200 will now be explained with reference to FIG. 11. In this processing, the operation of the control unit 103 is realized by the control unit 103 loading and executing programs stored in the recording unit 105 in the memory 104. Unless otherwise mentioned, the operation of each step is executed in the imaging device 200.

In the following explanation, operations executed by the components of the imaging device 200, such as the event detection unit 214, will be collectively explained as operations performed by the imaging device 200. Note that this processing starts, for example, when a direct or indirect predetermined operation instruction for changing the operation mode of the imaging device 200 to the detection mode is received via the operation unit 107 of the digital camera 100.

In step S1101, the control unit 103 controls the imaging device 200 to operate in the detection mode, and transitions the operation mode of the imaging device 200 to the detection mode. The imaging device 200 sets the operation mode of the imaging device 200 to the detection mode in response to receiving an instruction to operate in the detection mode from the control unit 103, and outputs pixel signals obtained through addition in each pixel block in the imaging device 200.

In step S1102, the imaging device 200 acquires the pixel signals obtained through addition in each pixel block from the pixel unit 220. The imaging device 200 temporarily stores the acquired pixel signals in the memory 262.

In step S1103, the imaging device 200 determines whether the acquired pixel signals from each pixel block are signals of the first image acquired after the start of the operation in the detection mode. If the imaging device 200 determines that the pixel signals are signals of the first image acquired after the start of operation, the processing returns to step S1102 because the difference from past data for detecting a change in the subject image cannot be obtained. If the imaging device 200 determines that the pixel signals to be processed are not signals of the first image acquired after the start of operation (in which case, past data exists), the processing proceeds to step S1104.

In step S1104, the imaging device 200 compares the pixel signals (of the n-th image) acquired in step S1102 with the pixel signals (of the (n−1)-th image) in the past data stored in the memory 262 to generate difference data for the pixel signals of each pixel block. At this time, the imaging device 200 determines whether or not the obtained difference data is equal to or greater than a predetermined threshold, and counts the number of pixel blocks corresponding to the difference data that is equal to or greater than the predetermined threshold.

That is, the imaging device 200 determines, for each pixel block, whether there is a block in which an event (i.e., a change in the subject image) has been detected, and counts the number of blocks in which an event has been detected. In the above example, the case in which the predetermined threshold value for determining the difference data is fixed is described as an example, but alternatively the predetermined threshold value may be changed in accordance with the subject type, the image capturing condition, or the user operation.

For example, when there is a change in a monitoring target, whose change should not be detected as a change in the subject, due to small motions, the predetermined threshold value can be increased to reduce erroneous detection of a change in the subject image (the detection accuracy can be adjusted).

In step S1105, the imaging device 200 determines the number of pixel blocks of which the corresponding difference data is equal to or greater than the predetermined threshold value (i.e., in which an event is detected). If the imaging device 200 determines that no pixel block in which the corresponding difference data is equal to or greater than the predetermined threshold value is counted (i.e., the number of pixel blocks is zero), the processing returns to step S1102 because no event is detected. In such a case, the above-described operation up to step S1104 for detecting a change in the subject image is repeated. In contrast, if the count is greater than zero (that is, if an event is detected), the imaging device 200 determines that an event has been detected, and processing proceeds to step S1106.

In step S1106, the imaging device 200 changes the operation mode of the imaging device 200 from the detection mode to the normal image capturing mode. For example, the image capturing mode transitions to the normal image capturing mode in which pixel signals are read in units of one pixel without pixel addition.

In step S1107, when the image capturing operation (i.e., recoding of captured images in the recording unit 105) is started after transitioning to the normal image capturing mode, the imaging device 200 resets the count value CNT for counting image data in the normal image capturing mode to zero. In step S1108, the imaging device 200 increments the count value CNT each time image data is acquired, and in step S1109, determines whether the count value CNT is equal to or greater than a predetermined number (N).

If the imaging device 200 determines that the counter value CNT is smaller than N, the processing returns to step S1108, and the normal image capturing mode is continued by repeating the processing after step S1108. In contrast, if the imaging device 200 determines that the counter value CNT is equal to or greater than N, the series of processing ends. Note that if the imaging device 200 determines that the counter value CNT is equal to or greater than N, the operation mode may be returned to the detection mode to further repeat the processing. In such a case, the processing returns to step S1101.

As described above, in the present embodiment, the imaging device 200 in the detection mode detects a change in a subject image by using signals obtained by addition of each pixel block. Event detection by each pixel block is performed by using a pixel block provided with an overlapping region. In this way, even when the change is small, as in a shift of the subject within a pixel block, the change of the subject image can be detected by the overlapping region, and the operation power consumption up to the event detection can be reduced.

That is, it is possible to improve detection accuracy while maintaining the effect of reducing power consumption without simply increasing the number of pixel blocks. In other words, an imaging apparatus that performs image capturing in response to detection of a change in a subject image can reduce power consumption and enhance detection accuracy for an operation of detecting a change in a subject image.

Note that in the example described above, the normal image capturing mode has been described to read the pixel signal in units of one pixel in which pixels are not added. However, the example is not limited thereto, and alternatively the number of added pixel signals and the number of thinned pixel signals may be changed within the range of required resolution in order to perform reading for addition of pixel signals, thinning of pixel signals, and the like in the row and column directions. In the example described above, although an example has been described in which a change in a subject image is detected by using pixel signals of each pixel block in which pixel signals are added in the detection mode, the addition of pixel signals may be performed after the pixel signals in the pixel block are thinned at predetermined intervals.

The above-described embodiments may be applied to a case in which color filters or the like are disposed in the pixel groups of the imaging device 200, and pixel signals are output by color. In such a case, addition of pixel signals of the same color may be performed by row or column in which output pixels of the same color are disposed.

Furthermore, in the above example, an example case has been described in which an overlapping region having a fixed size is provided for each pixel block in the reading of pixel signals in pixel block units in the detection mode. However, the size of the overlapping region may be varied by the size of the subject, the framerate, or the like, or by an instruction operation by the user. In addition to the size of the overlapping region, the size of the region of the pixel blocks may be varied, and the detection sensitivity may be varied in accordance with appropriate conditions.

Example of Implementing Imaging Device by Stacked Structure

The imaging device 200 described above may be implemented by an imaging device having a stacked structure as illustrated in FIGS. 12A to 12C. The imaging device 200 may include a semiconductor substrate 1201 and a semiconductor substrate 1202 illustrated in FIGS. 12B and 12C. The semiconductor substrates 1201 and 1202 are sealed in a superposed state and are modularized (integrated). That is, as illustrated in FIG. 12C, the semiconductor substrates 1201 and 1202 form a multilayer structure (stacked structure). A circuit formed on the semiconductor substrate 1201 and a circuit formed on the semiconductor substrate 1202 are connected to each other through a via or the like.

In this way, the imaging device 200 may be a module (also referred to as a large-scale integration (LSI) chip) in which the first semiconductor substrate 1201 and the second semiconductor substrate 1202 are integrated to form a multilayer structure. The first semiconductor substrate 1201 and the second semiconductor substrate 1202 forming such a multilayer structure in the module can enable the imaging device 200 to implement a larger scale circuit without increasing the size of the semiconductor substrates. That is, the imaging device 200 can implement a larger scale circuit while suppressing an increase in cost.

For example, each component included in the imaging device 200 may be formed on one of the first semiconductor substrate 1201 and the second semiconductor substrate 1202 as follows. For example, as illustrated in FIG. 12A, the above-described pixel unit 220, vertical scanning circuit 211, AD conversion circuit 212, and horizontal scanning circuit 213 are formed on the first semiconductor substrate 1201. The event detection unit 214, the signal processing unit 215, the mode control unit 216, and the exposure control unit 217 are formed on the second semiconductor substrate 1202.

Note that the arrangement illustrated in FIGS. 12A to 12C is a mere example, and the arrangement of the components on the first semiconductor substrate 1201 and the second semiconductor substrate 1202 is not limited thereto.

According to the present invention, an imaging apparatus that performs image capturing in response to detection of a change in a subject image can reduce operation power consumption and enhance detection accuracy for detection of a change in a subject image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
   at least one processor or circuit configured to function as following units;
   detecting unit that detects change in a subject image among pixel region having a plurality of pixels arranged in a two-dimensional pattern based on pixel signal of a first detection region and a second detection region of the pixel region; and
   controller that controls to perform image capturing in response to detection of the change in subject image by the detecting unit, and to output a captured image based on the pixel signals from the pixels of the pixel region,
   wherein a first partial region of the pixel region is preset as the first detection region, and a second partial region that is always partially overlapped with the first partial region of the pixel region is preset as the second detection region in a case where the detection unit detects the change in subject image.

2. The imaging apparatus according to claim 1, wherein an arrangement of the first partial region and the second partial region includes an arrangement in which positions differ in one of a row direction and a column direction of the pixels arranged on the imaging plane.

3. The imaging apparatus according to claim 2, wherein the first partial region and the second partial region arranged at different positions in one of the row direction and the column direction of the pixels arranged on the imaging plane overlap in a region of one-half of the first partial region.

4. The imaging apparatus according to claim 1, wherein the captured image is an image constituted by pixel signals from the pixels of the pixel region, the pixel signals not being subjected to addition or thinning.

5. The imaging apparatus according to claim 1, wherein the detecting unit detects the region in which the change in subject image among the pixel region by extracting pixel signals the first and second partial regions at a predetermined cycle and determining whether a change in the pixel signals between predetermined cycles exceeds a predetermined threshold value for change.

6. The imaging apparatus according to claim 5, wherein the predetermined threshold value for change is variable in accordance with an instruction from a unit external to the imaging apparatus.

7. The imaging apparatus according to claim 1, wherein the detecting unit detects the region in which the change in subject image among the pixel region based on pixel signals obtained by adding pixel signals from the pixels in the first and second partial regions or by thinning pixel signals of a predetermined pixel column or a predetermined pixel row from the pixel signals of the pixels of the first and second partial regions.

8. The imaging apparatus according to claim 1, further comprising:
   an imaging device formed by a stacked structure including a first semiconductor substrate and a second semiconductor substrate.

9. The imaging apparatus according to claim 8, wherein the first semiconductor substrate includes the pixels arranged in a two-dimensional pattern, and the second semiconductor substrate includes the detecting unit and the controller.

10. The imaging apparatus according to claim 1, further comprising:
    recording unit that records the captured image.

11. A control method of an imaging apparatus comprising:
    a detecting step of detecting change in a subject image among pixel region having a plurality of pixels arranged in a two-dimensional pattern based on pixel signal of a first detection region and a second detection region of the pixel region; and
    a controlling step of performing control to perform image capturing in response to detection the change in subject image in the detecting step, and to output a captured image based on the pixel signals from the pixels of the pixel region,
    wherein a first partial region of the pixel region is preset as the first detection region, and a second partial region that is always partially overlapped with the first partial region of the pixel region is preset as the second detection region in a case where the change in subject image is detected in the detecting step.

* * * * *